United States Patent Office 2,758,980
Patented Aug. 14, 1956

2,758,980

METHOD OF PRODUCING A CELLULAR ELASTOMERIC ARTICLE

Leon Talalay and Joseph A. Talalay, New Haven, and Thomas F. Bush, Derby, Conn., assignors, by mesne assignments, to The B. F. Goodrich Company, Akron, Ohio, a corporation of New York No Drawing. Application August 16, 1952, Serial No. 304,836

12 Claims. (Cl. 260—2.5)

This invention relates to procedure for producing cellular articles from an aqueous dispersion of an elastomeric material such as natural or synthetic rubber, and to articles produced thereby.

One of its chief objects is to provide, as an intermediate product, a foam having high heat conductivity, for quick and uniform transfer of heat through its body in the heat gelling or vulcanization of the foam, and for quick freezing of the foam, at an earlier stage, when freeze-coagulation, as in Talalay U. S. Patent No. 2,432,353, for example, is employed.

Other important objects are to provide accurate control of the density of the foam; to provide in an improved manner for producing the foam in place in a mold, for subsequent coagulation and vulcanization in the mold, permissibly with the mold closed before the foaming of the dispersion is complete, and thus to minimize or eliminate spillage of the foam or of the dispersion, and permissibly with the use of a gas-venting and foam-retaining diaphragm as in Talalay U. S. Patent No. 2,206,757; to provide a foam having small and uniform cell structure; to avoid entrapment of air and assure complete filling out of the foam into the ramifications of a mold cavity of complex form; to provide speed, facility and economy in the production of the foam; and, in the case of a closed-cell product, to provide a product having high heat conductivity.

Further objects are to avoid the breaking down of the foam which is caused by rise of temperature in the case of an exothermic reaction for liberation of a foam-producing gas, this advantage being especially important in the case of light, low density, foams; to avoid excessive dilution of the dispersion by the gas-producing substance or its reaction product; and to provide against adverse effects of a gas-producing substance upon compounding ingredients, such as antioxidants or vulcanization accelerators which are commonly used, an example of the latter being dithiocarbamates, which are subject to being oxidized to thiuram-type compounds, with the result that part of the original accelerator is deactivated or at least converted to a slower or less effective accelerating substance.

In its broad aspect, the invention resides in the use of hydrogen or helium, or a mixture comprising one or both of the two, as the gas occupying the cells of the material, on account of their high heat-conductivity. Hydrogen, for example, has at 32° F. a heat-conductivity of .100 B. t. u./(hr.) (ft.$^2$) (° F. per ft.); that of helium is .081 in the same units; and a blend composed of hydrogen eighty percent and carbon dioxide twenty percent, for example, has a heat-conductivity of .062 on the same basis.

The aqueous dispersion can be foamed by whipping it in an artificially maintained atmosphere of the gas, as by the use of a closed chamber; or the aqueous dispersion can be caused to become a foam by reason of bubbles of the gas being injected into or being created or liberated within it, followed, if desired, by mechanical stirring or shearing for purposes of refining or homogenizing the liquid foam.

In the case of hydrogen, the foaming is effected by the mixing into the dispersion of a substance, such as a metal hydride, adapted to take up oxygen from the water of the dispersion and liberate free hydrogen.

Suitable substances are the primary hydrides, such as NaH, LiH, KH, CaH$_2$, etc., and complex hydrides such as lithium aluminum hydride, sodium borohydride, potassium borohydride, lithium borohydride, aluminum borohydride and beryllium borohydride.

In the preferred practice of the invention an aqueous dispersion is prepared by conventional procedure with, for example, the following ingredients:

| | Grams, dry |
|---|---|
| Polymer (natural rubberlatex of 62% solids) | 100.00 |
| Soap (potassium stearate) (as a 10% solution) | 1.0 |
| Vicosifyer (sodium poly acrylate) (as a 10% solution) | 1.3 |
| Zinc oxide (as a 50% dispersion) | 5.0 |
| Sulfur (as a 60% dispersion) | 2.0 |
| Accelerator (Zinc diethyl dithiocarbamate) (as a 50% dispersion) | 0.5 |
| Accelerator (Zinc mercaptobenzothiazole) (as a 50% dispersion) | 1.0 |
| Antioxidant (sym-dimethyl amine) (as a 50% dispersion) | 1.0 |

The polymer mentioned above may be natural rubber latex or any one of the synthetic latices, such as polychloroprene latices (neoprene) or butadiene-styrene copolymer latices (GR–S latices) or co-polymers of butadiene and acrylonitrile (Perbunan, Hycar). It may be an emulsion of polyvinyl chloride (Geon latex) or any other film forming polymeric material. The polymer may also be a blend or copolymer comprising any of the above mentioned materials.

The compound so prepared can either be used in its then condition or may be further compounded for purposes of modification of its physical properties, or for cost reduction, with dispersions of powdered filler materials, such as clay, whiting or aluminum oxide, or with emulsions of oils, asphaltic materials or vulcanized oils (factices).

The quantity of compound required for a given article is measured out and the following steps performed:

In the case of the simple hydrides, the basic material is prepared by grinding some of the metal hydride in a previously dessicated oil (to remove traces of water).

A 10 to 20% suspension of LiH or similar hydride has been found suitable. A measured amount of the suspension is rapidly stirred into the latex compound, and the compound immediately poured into the mold or spread onto a belt if it is desired to produce sheet material.

If a chemical gel technique is used, a delayed action gelling agent such as Na$_2$Si F$_4$ may be added just prior to the addition of the hydride slurry. If the freeze-gelation method of U. S. Patent 2,432,353, is used, no further additions are needed.

The normal process steps of gelling (or freezing with subsequent coagulation), curing, washing, and drying are carried out.

In the case of some of the complex hydrides, such as NaBH$_4$ either the oil slurry method or a solution technique may be used.

It has been found that sodium boro-hydride (NaBH$_4$), unlike other hydrides, is relatively stable in cold water, especially if the pH of the system is alkaline. A 10% to 20% solution of the material is prepared by dissolving it in cold water, the pH of which has been adjusted to 10.0 or above by small addition of caustic alkali. This water solution is added to the compound. Either prior to the addition of the hydride or immediately thereafter, a catalyst is added to the system in order to rapidly and completely decompose the hydride present. Such catalysts may be surface active materials, such as activated charcoal, zeolite or aluminum powder, or they may be solutions of salts of heavy metals such as Cu, Zn, Co, Ni, Fe, etc. Further series of useful catalysts are acidic salts, boric acid or mild acids in general, in particular amino acids. Dispersed sulfur, selenium or metal sulfides, such as calcium, antimony or zinc sulfides, are also active catalysts.

Other compounds capable of catalyzing sodium borohydride have been found among the group of sulfur or selenium bearing compounds, such as are frequently used as rubber accelerators. Examples of these types of compounds are selenium diethyl dithio carbamate, mercapto benzo thiozole, tetra ethyl thiuram disulfide.

It is possible that the catalyst mechanism proceeds in these instances via the formation of colloidal sulfur or colloidal selenium, which in turn, especially in the presence of a good dispersing agent such as Emulfor On, Darvan #3, Triton X–100, or of cationic quaternary ammonium salts (such as lauryl pyridinium chloride or oleyl dimethyl ammonium bromide), catalyze the borohydride decomposition, possibly by a mechanism involving the formation of sulfides, selenides or tellurides.

The use of some of the catalytic agents referred to above has, however, some serious disadvantages in practicing the art of making foam rubber from latex.

For example, sulfur and selenium bearing catalysts have a tendency to develop noxious or toxic gaseous reaction products on reduction with hydrogen; heavy metal salts frequently form dark precipitates; and heavy metal borides have a tendency to coagulate or gel the latex. Some of the heavy metal ions act as oxidation promotors, resulting in poor aging compounds. Finely dispersed substances such as aluminum powder or activated charcoal do not have any of these disadvantages but their rate of activation for the borohydride catalysis is only very moderate. Formaldehyde and acetone, while also decomposing borohydrides, form alchols, which tend to destabilize the foam.

Because of the imperfections just referred to, a preferred method of working our invention is with the aid of an acidic activator for the borohydride. In the preferred manner of working our invention the borohydride is dissolved at a pH in excess of pH 10 in cold water, and it is added to a latex compound the alkalinity of which has been reduced to a pH of 8 to 8½ by any suitable or preferred acid material, after addition to the latex of an acid protecting stabilizer, such as Emulfor (a condensation product of an alcohol with an ethylene oxide), saponin, Acrysol (sodium polymethacrylate) or the like. Depending upon the correct choice of pH conditions, the catalysis will proceed at a desired and controlled rate.

An alternate method of practicing the borohydride catalysis is the introduction into the system of a material which undergoes a slow hydrolysis resulting in an acidic product, and in this manner slowly depressing the pH of the system, started from an alkaline latex. Examples of such substances are sodium, potassium or ammonium salts of fluoro silicic or fluoro boric acids, such as for instance sodium silico fluoride. The advantage of such a procedure is that it results in a very definite induction period for the borohydride catalysis. When the hydride is added to latex, and the addition is followed up with a small quantity of sodium silico fluoride, a quantity insufficient to cause gelling, the pH of the system begins to drop gradually. When the pH has reached a level at which the catalysis is active, hydrogen evolution is started and the catalysis is completed within a reasonably short time. It should be noted that this method should also preferably be worked in the presence of an acid stabilizer, such as Emulfor, Aquarex D, cationic quaternary ammonium salts, saponin, or acrysol.

In another specific example of the practice of the invention 1,000 grams of wet compound (approximately 600 grams dry solids) was prepared as above tabulated and to it were added, as a slurry and thoroughly stirred in, 3.5 grams dry of Emulfor On, as a 25% solution, and 50 grams, dry, of Glycine.

The original pH before Glycine addition was 10.32. After Glycine addition the pH became 8.50.

Then, 60 ml. of a 10% aqueous solution of sodium borohydride prepared at a pH of 10.5 was added. While the froth was being evolved, it was poured into a mold of approximately 400 cubic inches volume, and after complete expansion of the foam was frozen, permeated with a coagulant gas ($CO_2$), and then vulcanized, removed from the mold, washed and dried.

With regard to the advantages of the invention:

1. $NaBH_4$ for example, generates only about one-third as much heat for an equal volume of gas produced as does the decomposition of hydrogen peroxide. This can be seen from:

$$NaBH_4 + 2H_2O \rightarrow NaBO_2 + 4H_2 + 63.9 \text{ K Cal.}$$

whereas $$2H_2O_2 \xrightarrow{Cat} 2H_2O + O_2 + 47.8 \text{ K Cal.}$$

or $$NaH + H_2O \rightarrow NaOH + H_2 + 31.5 \text{ K Cal.}$$

As can be seen from the above reactions, the generation of one mol of gas (22.4 litres at normal temperature and pressure) is attended by the evolution of 47.8 kilogram calories in the case of the decomposition of hydrogen peroxide, while in the case of sodium hydride 31.5 kilogram calories are produced, and in the case of sodium boro-hydride the heat effect amounts to less than 16 kilogram calories for the same volume of gas. As an example, it is not unusual in the manufacture of light density foam by the decomposition of hydrogen peroxide to observe a temperature rise from 50° F. to a final temperature, after decomposition, of 110° F. When making a foam of equal density with sodium borohydride, and with the same starting temperature of 50° F., the terminal temperature will be 70° F. A liquid foam structure at 70° F. is considerably more stable than at 110° F.

2. While the addition of $H_2O_2$ results in partial destabilization of a latex system, the lower heat build-up in our procedure, together with the fact that the decomposition products of the hydrides are either alkalies (e. g. NaOH) or alkaline buffers (e. g. $NaBO_2$), results in enhancing the stability of a latex system in which a hydride has been decomposed.

3. A further advantage lies in the fact that relatively small amounts of hydrides, in relation to the latex compound, are needed and the resultant dilution effect is very small. In fact, some of the materials remove water from the system. For example, $LiH + H_2O$ (from the aqueous phase of the latex) $\rightarrow LiOH + H_2$.

Only approximately seven grams of LiH are needed to produce 22.4 litres of hydrogen gas.

Even in the case of the hydrides which are added in aqueous solution, such as:

$$NaBH_4 + 2H_2O \rightarrow NaBO_2 + 4H_2$$

the dilution effect is far less than in the case of $H_2O_2$, especially in view of the fact that some of the water present is reacted away.

4. Oxidizing influences are absent and, therefore, the properties of the compounding materials such as antioxidants and accelerators remain unaffected, whether the gas is liberated in the dispersion or is entrained in it by the whipping procedure.

5. Perhaps the most outstanding advantage of the method is that the specified procedure results in the improvement of the thermal conductivity of the liquid foam. The thermal conductivity of $H_2$ at 32° F. is .100 as against air or oxygen being .014 B. t. u./(hr.) (ft.²) (° F. per ft.).

Consequently, a hydrogen filled foam of 10#/cu. foot density in the wet state (6#/cu. ft. after curing and drying) has a thermal conductivity of approximately .12 B. t. u./(hr.) (ft.²) (° F. per ft.), while a foam of equivalent density, oxygen filled, has a thermal conductivity of .04 B. t. u./(hr.) (ft.²) (° F. per ft.). This means that the penetration of heat or cold into the interior of such a foam can be performed approximately three times as efficiently.

Further variations of the procedure are of course possible without sacrifice of all of the advantages above set out and without departure from the scope of the invention as defined by the appended claims in which the word rubber is intended to be inclusive of both natural and synthetic rubber and other rubber-like materials which, like those mentioned herein, are known in the art as being capable of being dispersed in an aqueous medium, foamed, and then coagulated or gelled.

We claim:

1. A method for making latex foam rubber which comprises forming a rubber latex foam in which the cells are substantially filled with a gas having a thermal conductivity at 32° F. of at least 0.03 B. t. u./(hr.) (ft.²) (° F. per ft.), freezing said foam to a solid phase, and coagulating the frozen foam 2. A method for making latex foam rubber which comprises forming a rubber latex foam in which the cells are substantially filled with a gas selected from the group consisting of hydrogen and helium, freezing said foam to a solid phase, and coagulating the frozen foam.

3. A method for making latex foam rubber which comprises forming a rubber latex foam by entrapping helium gas in said rubber latex, freezing said foam to a solid phase, and coagulating the frozen foam.

4. A method for making latex foam rubber which comprises forming a rubber latex foam by entrapping hydrogen gas in said rubber latex, freezing said foam to a solid phase, and coagulating the frozen foam.

5. A method for making a cellular rubber article which comprises dispersing a metal hydride selected from the group consisting of sodium borohydride, potassium borohydride, lithium borohydride, aluminum borohydride and beryllium borohydride into a rubber latex to cause said latex to be foamed by hydrogen liberated in said latex when said metal hydride reacts with the water in said latex.

6. A method for making a cellular rubber article which comprises dispersing sodium borohydride into a rubber latex to cause said latex to be foamed by hydrogen liberated in said latex when said sodium borohydride reacts with the water in said latex.

7. A method for making a cellular rubber article which comprises dispersing into a rubber latex a substantially stable aqueous solution of sodium borohydride, said solution being prepared by dissolving sodium borohydride in cold water having a pH of at least 10, and a catalyst which when incorporated with said latex and said solution forms a colloidal dispersion of sulfur, said catalyst being selected from the group consisting of dithiocarbamates, mercaptans, thiurams and thioureas.

8. The method for making a cellular rubber article which comprises dispersing into a rubber latex a substantially stable aqueous solution of sodium borohydride, said solution being prepared by dissolving sodium borohydride in cold water having a pH of at least 10, and a catalyst selected from the group consisting of charcoal, zeolite and aluminum powder, said catalyst causing said sodium borohydride to react rapidly with the water of said latex whereby hydrogen is liberated in said latex causing said latex to foam.

9. A method for making a cellular rubber article which comprises dispersing into a rubber latex a substantially stable aqueous solution of sodium borohydride, said solution being prepared by dissolving sodium borohydride in cold water having a pH of at least 10, and a catalyst selected from the group consisting of boric acid and amino acids, said catalyst causing said sodium borohydride to react rapidly with the water of said latex whereby hydrogen is liberated in said latex causing said latex to foam.

10. A method for making a cellular rubber article which comprises dispersing a substantially stable aqueous solution of sodium borohydride, said solution being prepared by dissolving sodium borohydride in cold water having a pH of at least 10, into a rubber latex having a pH of about 8 to 8.5 whereby hydrogen is liberated in said latex causing said latex to foam.

11. A method for making a cellular rubber article which comprises dispersing into a rubber latex having a pH above about 10 a substantially aqueous solution of sodium borohydride, said solution being prepared by dissolving sodium borohydride in cold water having a pH of at least 10, and a hydrolite selected from the group consisting of boro-chlorides, silico fluorides, zircono fluorides and titano fluorides of alkali metals, the said fluorides of alkali earth metals, and the said fluorides of the ammonium derivates of the said metals, said hydrolite when hydrolyzed forming an acid product in said latex insufficient in amount to coagulate said latex, said acid product reducing the pH of said latex sufficiently to cause said sodium borohydride to react with water in said latex liberating hydrogen in said latex and causing said latex to foam.

12. The method for making a cellular rubber article which comprises dispersing into a rubber latex having a pH above about 10 a substantially stable aqueous solution of sodium borohydride, said solution being prepared by dissolving sodium borohydride in cold water having a pH of at least 10, and sodium silico fluoride which upon hydrolysis forms an acid product in said latex insufficient in amount to coagulate said latex, said acid product reducing the pH of said latex sufficiently to cause said sodium borohydride to react with the water in said latex liberating hydrogen in said latex and causing said latex to foam.

References Cited in the file of this patent

UNITED STATES PATENTS

| | | |
|---|---|---|
| 1,921,108 | Twiss et al. | Aug. 8, 1933 |
| 2,226,517 | Binns et al. | Dec. 24, 1940 |
| 2,261,459 | Cooper et al. | Nov. 4, 1941 |
| 2,290,736 | Buffington et al. | July 21, 1942 |
| 2,341,509 | Bley | Feb. 15, 1944 |
| 2,513,997 | Gibb | July 4, 1950 |
| 2,582,228 | Brinkema | Jan. 15, 1952 |

FOREIGN PATENTS

| | | |
|---|---|---|
| 571,284 | Great Britain | Aug. 17, 1945 |

OTHER REFERENCES

Sachs, "Modern Plastics," December 1945 (pages 172–176).